UNITED STATES PATENT OFFICE.

ALEXANDER McDOUGALL, OF MANCHESTER, ENGLAND, ASSIGNOR, BY MESNE ASSIGNMENTS, TO JAMES S. MILLAR, OF MONTREAL, CANADA.

IMPROVEMENT IN INSECT-DESTROYING AND DISINFECTING COMPOUNDS.

Specification forming part of Letters Patent No. 66,725, dated July 16, 1867; reissue No. 5,292, dated February 18, 1873.

*To all whom it may concern:*

Be it known that I, ALEXANDER McDOUGALL, of Manchester, Great Britain, have invented certain new and useful Improvements in Materials and Composition for the Destruction of Insects and Vermin, and also in materials which may be used as disinfectants, of which the following is a specification:

This invention consists essentially in the application and use of the oil obtained (after the naphtha or spirit has been removed) in the distillation of tar resulting from the destructive distillation of carbonaceous substances, or of any constituents of the oil, combined with an alkali or alkaline earth, and with fatty or or other acids, to and in the destruction of insects and vermin and entozoic parasites, and as a disinfectant.

In order that my invention may be fully understood, I will now proceed to describe a method by which the same may be carried into practical operation.

If intended as a dressing for sheep or other animals, I take the oil above mentioned and act upon it with an alkali. This mixture is then heated and agitated. I then add fat, tallow, or other saponifiable substance, and also add further sufficient quantity of alkali to effect saponification.

The proportions may be varied; but those I prefer are, two parts by weight of the oil; one part by weight of caustic soda of 50° Twaddel; one part by weight of fat, tallow, or other saponifiable substance.

The composition may also be made by treating one or more of the constituents of the oil in the same manner; but I prefer to take the oil as a whole when intended as a sheep-dressing.

The composition thus prepared, if not to be used for salving, may be dissolved in water and used as a bath, in which the sheep or other animals may be dipped; or it may be used by pouring or otherwise, as is well known to those acquainted with the management of stock requiring such treatment.

When I employ the oil as a disinfectant of fecal or other matters I add to the oil or any of its constituents about three per cent. of nitric acid during agitation. The proportion of nitric acid may be increased or diminished. The resulting product is mixed with water containing lime, magnesia, or other alkali or alkaline earth in suspension.

This mixture can be applied to the fecal or other matters, or to the source of impurity, in order to effect disinfection; also to sewage waters, with a view of removing offensive smell and rendering the sewage not liable to putrefaction or decay; and also to destroy entozoic parasites contained therein or in the soils to which the sewage thus treated may be applied; or the mixture itself may be applied to soils to destroy worms, insects, &c.

Having now described my invention and the manner in which the same is or may be carried into effect, what I claim, and desire to secure by Letters Patent, is as follows:

1. The oil obtained (after the naphtha or spirit has been removed) in the distillation of tar resulting from the destructive distillation of carbonaceous substances, or of any of the constituents of this oil, in combination with an alkali or alkaline earth and with fatty or other saponifiable substances, substantially as herein described, as a dressing for sheep or other animals and for other purposes.

2. The oil herein specified, or any of its constituents, after treatment with an acid, as described, in combination with an alkali or alkaline earth, as a material for the disinfection of fecal, sewage, or other matters, and the destruction of entozoic parasites contained therein, or for the destruction of entozoic parasites or vermin in soils.

In testimony whereof I have signed my name to this specification in the presence of two subscribing witnesses.

ALEXANDER McDOUGALL.

Witnesses:
JOHN PRATT,
WM. CARROLL JOHNSON.